Oct. 7, 1958        H. L. VAN ALSTYNE        2,855,057
PITCH LOCK DISABLING MEANS FOR VARIABLE PITCH PROPELLERS
Filed June 14, 1956        2 Sheets-Sheet 1

INVENTOR
HAROLD L. Van ALSTYNE
BY
ATTORNEY

Oct. 7, 1958     H. L. VAN ALSTYNE     2,855,057
PITCH LOCK DISABLING MEANS FOR VARIABLE PITCH PROPELLERS
Filed June 14, 1956     2 Sheets-Sheet 2

INVENTOR
HAROLD L. Van ALSTYNE
BY Leonard F. Wehrlind
ATTORNEY

United States Patent Office 2,855,057
Patented Oct. 7, 1958

2,855,057

PITCH LOCK DISABLING MEANS FOR VARIABLE PITCH PROPELLERS

Harold L. Van Alstyne, West Hartford, Conn., assignor to United Aircraft Corporation, East Hartford, Conn., a corporation of Delaware Application June 14, 1956, Serial No. 591,375

4 Claims. (Cl. 170—160.21)

This invention relates to variable pitch propellers and more particularly to mechanisms for locking the blades against pitch change.

Copending patent application Serial No. 591,465 filed by Raymond P. Lambeck as of even date claims and describes a hydraulic pitch lock for variable pitch propellers, which pitch lock operates to trap fluid on one side of a pitch changing servo motor.

It is an object of this invention to provide, among other things, a means for positively disabling or disengaging the pitch lock in order to permit other pitch change operations.

This and other objects of this invention will become readily apparent from the following description of the drawings in which.

Although pitch locks of various types are well-known in the art, most of these pitch locks require expensive heavy mechanisms whose weight and bulk cannot be tolerated in present day propeller requirements. Furthermore, these pitch locks operate on a principle involving the mechanical engagement of the blades with a fixed hub portion to positively prevent movement of the blades. According to this invention all these disadvantages are eliminated.

Figure 1:
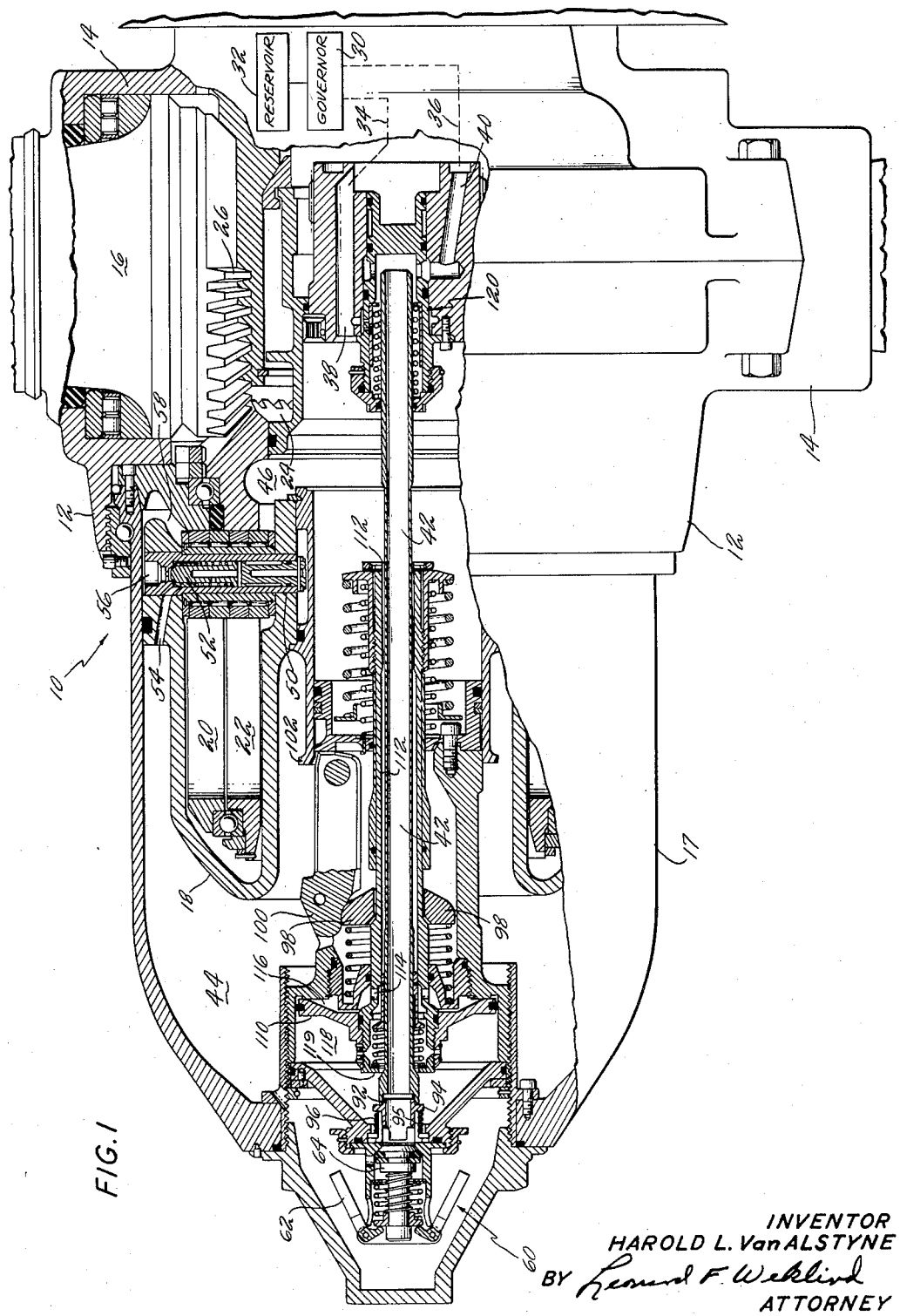
Fig. 1 is a partial cross-sectional view of a propeller with certain parts being shown schematically.

Referring to Fig. 1, a propeller assembly is generally indicated at 10 as having a hub 12 having a plurality of blade retaining sockets 14 in which are mounted one or more blades 16 for pitch changing movement relative thereto. A propeller dome 17 houses a main hydraulically operated pitch changing piston 18 which through cams 20 and 22 rotates a gear 24 which engages a gear segment 26 for varying the pitch of the blade 16. The pitch of the blades 16 is controlled by a governor schematically illustrated at 30 which governor controls the flows of high pressure fluid from the reservoir 32 to either a low pitch line 34 or a high pitch line 36 both schematically illustrated as dotted lines in the drawing. The low pitch passage 38 communicates with the aft side of the pitch changing piston 18 while the high pitch passage 40 communicates with the front side of the piston 18 via an oil transfer tube 42. The governor control of pitch changing piston is more fully disclosed in U. S. Patent No. 2,402,065, issued June 11, 1946, to E. Martin.

When an increase in blade pitch is required, high pressure fluid is fed via the line 36 to the high pitch passage 40 then to the oil transfer tube 42 and then out to the forward side 44 of the main piston 18. On the other hand, movement of the blades toward low pitch is accomplished by directing high pressure fluid to the line 34, low pitch passage 38 and then to the aft side 46 of the pitch changing piston 18.

In order to provide a circulation of fluid when the propeller blade is at a given operating pitch, at least one of the cam rollers 50 contains a bleed valve 52 which connects the front side 44 of the piston 18 with the aft side 46 thereof by means of passages 54, 56 and 58. A small bleed is necessary to insure a constant minimum circulation of oil under normal operating conditions, and thus maintain a minimum operating temperature of oil under low ambient temperature conditions.

Figure 2:
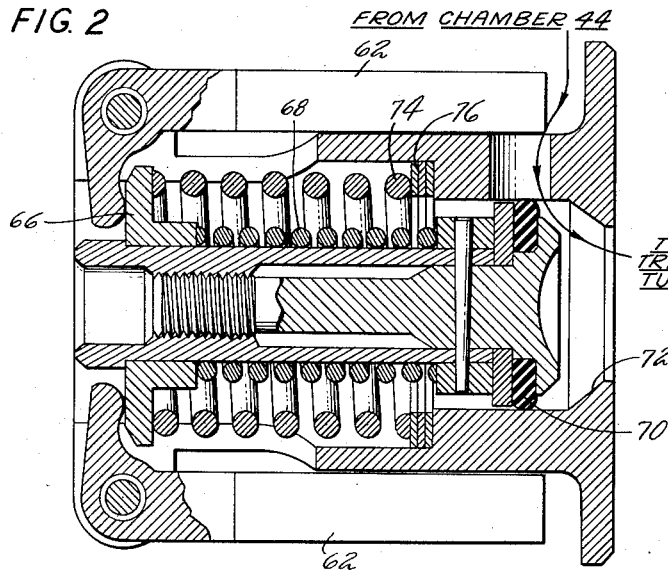
Fig. 2 is an enlarged detailed showing of the overspeed pitch lock valve.

According to this invention a centrifugally operated valve generally indicated at 60 is located in the nose of the propeller dome 17. The valve 60 comprises a flyweight unit 62 (see also (Fig. 2) and a valve element 64. The flyweight 62 during a predetermined overspeed will act on bearing plate 66. Bearing plate 66 compresses the spring 74. Spring 68 is preloaded and its length remains constant until the valve 64 is seated. The valve seal 70 engages with the seat 72. If the flyweights 62 exert enough force on the bearing plate 66 to continue to force it to the right after the valve seats, then spring 68 will be compressed. Spring 68 is primarily a "lost-motion" provision whose main value is shown by its operation during the reversing and feathering cycles of the propeller. This operation is better described hereinafter. The propeller R. P. M. at which the flyweights will seat the valve seal 70 will depend on the capacity of the spring 74 and the number of adjusting shims 76 located in the assembly.

Figure 3:
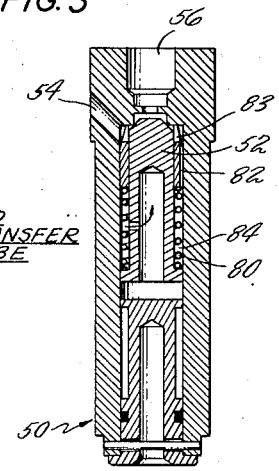
Fig. 3 is an enlarged detailed showing of the centrifugally operated bleed valve.

When a propeller overspeed is encountered, it is usually accompanied with a lack of sufficient pressure in the transfer tube 42 and the chamber 44 on the front side of the piston 18 to overcome blade centrifugal twisting moment which tends to move the blades toward low pitch and the piston 18 forward or outboard. Under these conditions further movement of the blades towards a lower pitch will cause a further overspeed and possible damage to the propeller, power plant and airplane structure if not avoided. In order for the propeller blade 16 to go toward a further overspeed or lower pitch position, it is necessary for the main servo piston 18 to move in a forward or outboard direction. Since the chamber 44 at the forward side of the piston 18 is filled with oil, a positive pitch lock can be obtained by preventing the oil in the chamber 44 from draining therefrom. Thus when an overspeed occurs the flyweights 62 are intended to urge the valve 64 to a position whereby the seal 70 engages the seat 72 thus preventing any further oil from draining from the chamber 44 and into the oil transfer tube 42. At the same time it is also necessary to close off the bleed between the forward side 44 and the aft side 46 of the main piston 18. As previously indicated, this bleed was provided by means of a valve 52 located in the cam roller 50. This valve is better illustrated in Fig. 3. Under normal operating conditions the valve element 52 is held in a downward position by means of a spring 80 thereby permitting a passage of fluid from the line 54 to the line 56 which connect both sides of the piston 18. When a predetermined overspeed is encountered the valve element 52 by centrifugal force will move to the position shown so as to prevent passage of fluid from the line 54 to the line 56. At the same time fluid under pressure which is trapped in the forward side 44 of the piston 18 will flow to the line 54 and then through a groove 82 in sleeve 83 and then into the chamber 84 thereby aiding the centrifugal force in holding the valve element 52 against its seat. Normally the spring 80 will be of such a capacity that the bleeding of fluid will be prevented at some propeller speed just below that at which the cam pitch lock valve element 64 goes into operation.

In normal applications, it is planned to set valve 64 so that it will close at some R. P. M. below take-off R. P. M. The setting of spring 80 in the bleed shut-off valve will determine the R. P. M. (above take-off R. P. M.) at which full pitch lock action will occur. This is done so that at the beginning of an overspeed, the main oil flow from the propeller dome will be blocked off and the R. P. M. will increase at a relatively lower rate until the bleed shut-off valve closes, finally locking the pitch. This reduced rate of approach to the final lock pitch setting prevents overshooting the set R. P. M. due to inertia effects. It also gives the pilot a little longer period to warn him that something is going wrong.

The valve 64 is designed so that feathering the propeller can be readily accomplished even when the valve is held closed with the flyweights. This feature is gained through the spring 68. If valve 64 is held closed by the flyweights, and if oil pressure is applied at the oil transfer tube side (right-hand side) of the valve, the valve can be opened readily by compressing spring 68. The oil pressure to open the valve is equal to the operating pressure (that is, back pressure) on the left-hand side of the valve plus only a very small additional amount needed to compress the spring. Thus, the operation of the pitch lock valve will not act to prevent feathering or to prevent the regaining of normal governing operation if pressure again becomes available in the oil transfer tube.

Once an overspeed occurs and valves 64 and 52 are closed, they will be held closed by the back pressure in the main dome chamber on the outboard side of piston 18. This back pressure of course comes from the blade centrifugal twisting moments urging the blades toward low pitch. This is an important feature and insures that, even though the pilot reduces the engine power setting or slows the airplane down to bring the R. P. M. down to a low range, the pitch lock will remain locked. It will remain locked until either (a) adequate oil pressure is applied in the oil transfer tube 42 to open valve 64, or (b) virtually all back pressure disappears behind the two valves 64 and 52, as when the propeller is stationary following a feathering operation. With this feature, it will generally be possible for the pilot to reduce the R. P. M. of an overspeeding propeller to a very moderate value by reducing throttle setting and slowing down the airplane. At this R. P. M., the drag of the windmilling propeller will be low even if the feathering system is disabled and the propeller cannot be feathered. Moreover, it is easier to get the propeller feathered if the windmilling is very low.

There are certain conditions of operation when the pitch lock will be in an engaged or active position and it is desirable to suddenly reduce the pitch of the blades. Such a condition may occur during take-off where a malfunction will cause the hydraulic pitch locks to engage and then the pilot desires to suddenly reverse the propellers to provide a braking effect. To this end a means is provided for mechanically forcibly unseating the valve element 64 so that there is a free flow of fluid from the chamber 44 into the oil transfer tube 42. The desired flow under these conditions is as shown by the arrows in Fig. 2.

Returning, however, to Fig. 1, the forward end of the oil transfer tube includes a concentric inner sleeve 92 having upstanding members 94 engaged by a spring 96. The members 94 are slidable in slots 95 at the upstream end of tube 42. The spring 96 holds the sleeve 92 in the position shown so it is out of engagement with the valve element 64. However, when a reverse position of the propeller is desired, it is necessary to withdraw the mechanical pitch stop wedge 98 so that the stops 100 can be retracted to a position whereby the piston 18 is free to move to a forward position. Normally the stop 100 would be engaged by the sleeve 102 carried by the piston 18. The operation of these mechanical low pitch stops is more clearly illustrated in U. S. patent application No. 413,188, filed March 1, 1954, by R. P. Lambeck.

In order to remove the wedge 98 from the position shown, it is necessary to move the servo piston 110 toward the left. Since in the reversing position high pressure fluid will be fed to the aft side of the servo piston 18, i. e., chamber 46, this fluid will be available to flow into the slot 112 adjacent the aft end of the oil transfer tube. This slot 112 connects with a port 114 and then the chamber 116 on the aft side of the servo piston 110 (see the above-referred-to application Serial No. 413,188). When the servo piston 110 moves toward the left the oil in the chamber 118 on the forward side of the piston flows out through suitable slots (such as 95) in the oil transfer tube and then via the transfer tube 42 out to drain. As the servo piston 110 moves forward, an anular lip 119 on the forward side thereof engages one of the flange like elements 94 on the sleeve 92. Following this and during movement of the servo piston 110 to the left the sleeve 92 is forced to the left thereby engaging the pitch lock valve element 64 so as to unseat this valve to permit fluid to flow from the chamber 44 into the oil transfer tube 42. Thus the hydraulic pitch lock is physically and mechanically disabled to permit a reversing of the propeller.

Figure 4:
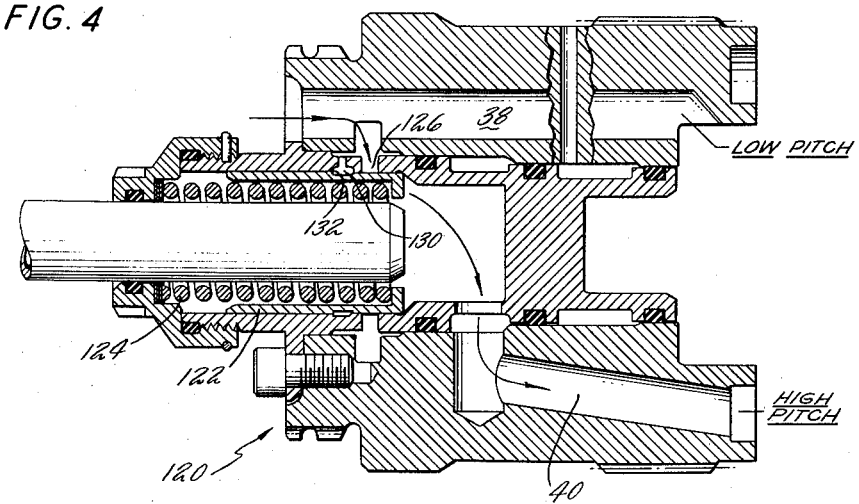
Fig. 4 is an enlarged detailed showing of the surge valve.

When the propeller has reached its extreme reverse position is is desirable to reduce the pressure on the aft side of the pitch changing piston 18, i. e., chamber 46 to a minimum. In other words, it is desired to have only sufficient pressure exerted on the back side of the pitch changing piston 18 to keep it in a full reverse position as opposed to blade centrifugal twisting moment. Thus although the main relief valve may be open in the 800 to 1000 p. s. i. range a surge valve is provided which will open in approximately to 500 p. s. i. range. To this end at the right-hand end of the oil transfer tube 42 is located a surge valve generally indicated at 120. Thus as better seen in Fig. 4, a valve sleeve 122 is urged to the right by a spring 124. In the position shown passage of fluid from the line 38 and the port 126 is prevented from flowing past the sleeve toward the passage 40. However, when sufficient pressure is built up in the chamber 38 and on the aft side of the pitch changing piston 18, pressure will build up in the chamber 130 so that pressure will act on the differential area 132 of the sleeve 122 to force it toward the left against the pressure of spring 124 to permit free passage of fluid from passage 38, port 126 and then to port 40. This in reality drains fluid from one side of the pitch changing piston 18 to the opposite side thereof thereby reducing the differential pressure acting on the piston. This in turn relieves the stresses in the hub and provides only sufficient pressure to maintain the blades in a full reverse position.

As a result of this invention, a simple yet highly efficient pitch lock mechanism has been provided whereby the safety of pitch lock operation is obtained with a very slight increase in the cost of production propellers. Furthermore, propellers already in use can be simply modified with a minimum of cost and extra parts. Furthermore, a pitch lock has been provided which is very light and particularly small as compared with the bulky mechanical pitch locks known heretofore.

Although only one embodiment of this invention has been illustrated and described herein, it will be apparent that various changes and modifications can be made in the construction and arrangement of the various parts without departing from the scope of this novel concept.

What it is desired by Letters Patent is:

1. In a propeller having variable pitch blades, means for varying the pitch of said blades including a servo motor, means conducting high pressure fluid to at least one side of said servo motor for controlling said servo motor, a control system including a speed governor providing increase pitch and decrease pitch control signals including operative connections to said conducting means, means responsive to a predetermined overspeed condition of said propeller for trapping high pressure fluid in said one side regardless of the control signal of said speed governor, and means responsive to a signal from said control system for disabling said overspeed responsive means.

2. In a propeller having variable pitch blades, means for varying the pitch of said blades including a servo motor, means conducting high pressure fluid to at least one side of said servo motor for controlling said servo motor, a control system including a speed governor providing increase pitch and decrease pitch control signals including operative connections to said conducting means, means responsive to a predetermined overspeed condition of said propeller for trapping high pressure fluid in said one side regardless of the control signal of said speed governor, movable pitch stop means, and means responsive to predetermined movement of said pitch stop means for disabling said overspeed responsive means.

3. In a propeller having variable pitch blades, means for varying the pitch of said blades including a servo motor, means selectively conducting high pressure fluid to one side of said servo motor and connecting low pressure to the other side of said servo motor for controlling said servo motor and increasing and decreasing the blade pitch, a speed governor providing increase pitch and decrease pitch control signals to said controlling means, means responsive to a predetermined overspeed condition of said propeller for trapping high pressure fluid in said one side regardless of the control signal of said speed governor, a movable pitch stop, a second servo motor for operating said stop, and means responsive to movement of said second servo motor in one direction for disabling said trapping means.

4. In a propeller having variable pitch blades, means for varying the pitch of said blades including a servo motor, means selectively conducting high pressure fluid to one side of said servo motor for controlling said servo motor, a speed governor providing increase pitch and decrease pitch control signals to said controlling means, means responsive to a predetermined overspeed condition of said propeller for trapping high pressure fluid in said one side regardless of the control signal of said speed governor, a bleed from one side of said motor to the other, overspeed responsive means for closing and opening said bleed, a movable pitch stop, a second servo motor for operating said stop, and means responsive to movement of said second servo motor in a given direction for disablying said trapping means.

References Cited in the file of this patent

UNITED STATES PATENTS 2,748,877     Miller et al. _____ June 5, 1956